United States Patent [19]

Moakler et al.

[11] 4,021,678

[45] May 3, 1977

[54] AUTOMATIC TRANSFER SWITCH

[75] Inventors: William A. Moakler, Basking Ridge; Charles Stotz, Upper Montclair, both of N.J.

[73] Assignee: Automatic Switch Company, Florham Park, N.J.

[22] Filed: Jan. 19, 1976

[21] Appl. No.: 650,386

[52] U.S. Cl. .................................. 307/64; 335/161
[51] Int. Cl.² .................................... H02J 9/00
[58] Field of Search ............. 307/64, 68, 23; 335/161, 113; 340/333

[56] References Cited

UNITED STATES PATENTS

| | | | |
|---|---|---|---|
| 2,861,198 | 11/1958 | Soos | 307/64 |
| 3,132,255 | 5/1964 | Spinelli et al. | 307/64 |
| 3,936,782 | 2/1976 | Moakler et al. | 335/161 |

Primary Examiner—Robert K. Schaefer
Assistant Examiner—Morris Ginsburg
Attorney, Agent, or Firm—Alan H. Levine

[57] ABSTRACT

An automatic transfer switch having two sets of phase switches, one set for connection between a normal power source and a load and the other set for connection between an emergency power source and the load. The transfer switch also includes two neutral switches, one for connection between the normal source neutral and the load neutral, and the other for connection between the emergency source neutral and the load neutral. Only one set of the phase switches can be closed at any one time, and during transfer of the load from one source to the other both sets of phase switches are open. Prior to a transfer operation, the neutral switch corresponding to the closed set of phase switches is closed and the neutral switch corresponding to the open set of phase switches is open. During transfer of the load, both neutral switches are closed before the closed set of phase switches open and both neutral switches remain closed until after the closed set of phase switches open and the open set of phase switches close. Thereafter, the neutral switch which had originally been open remains closed and the neutral switch which had originally been closed opens.

10 Claims, 16 Drawing Figures

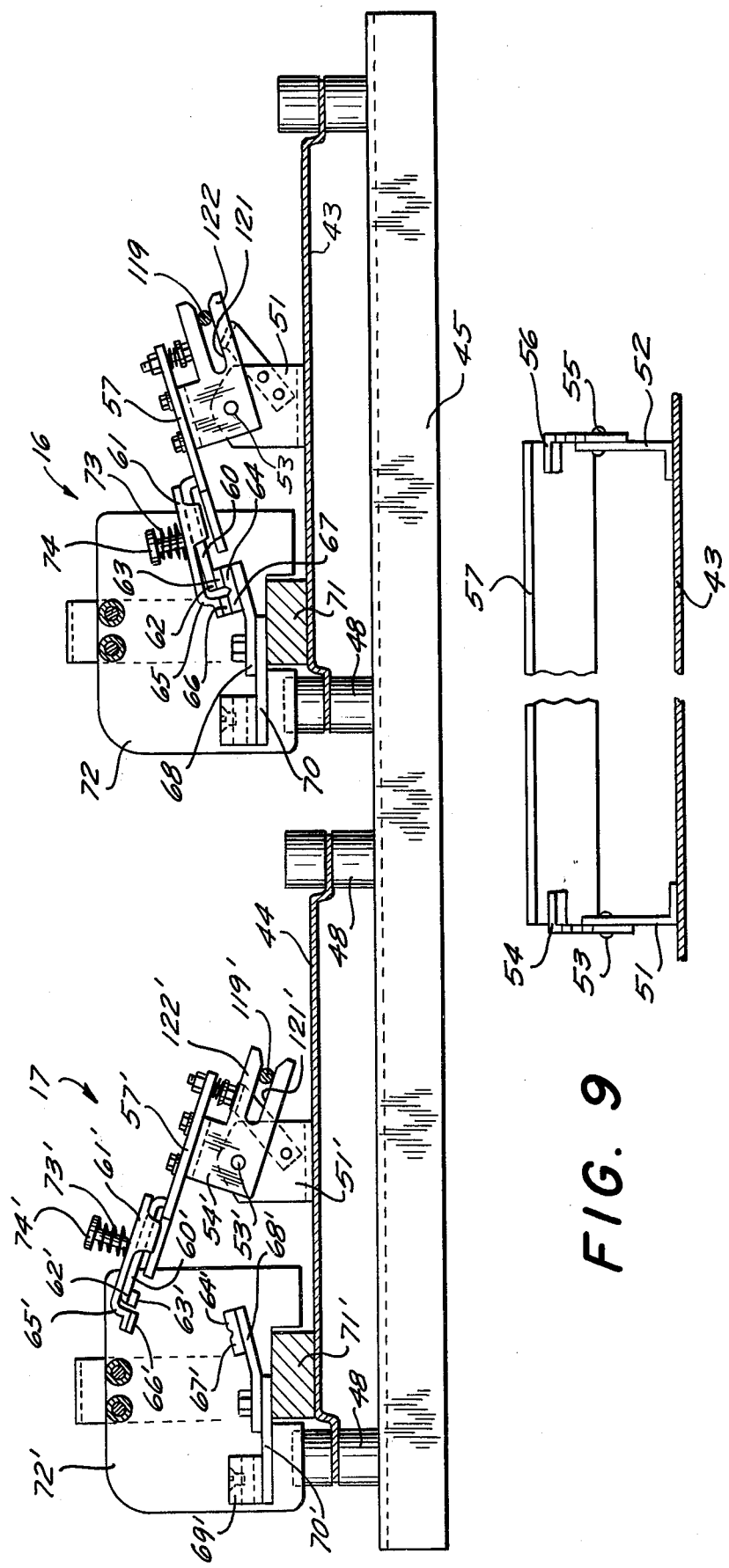

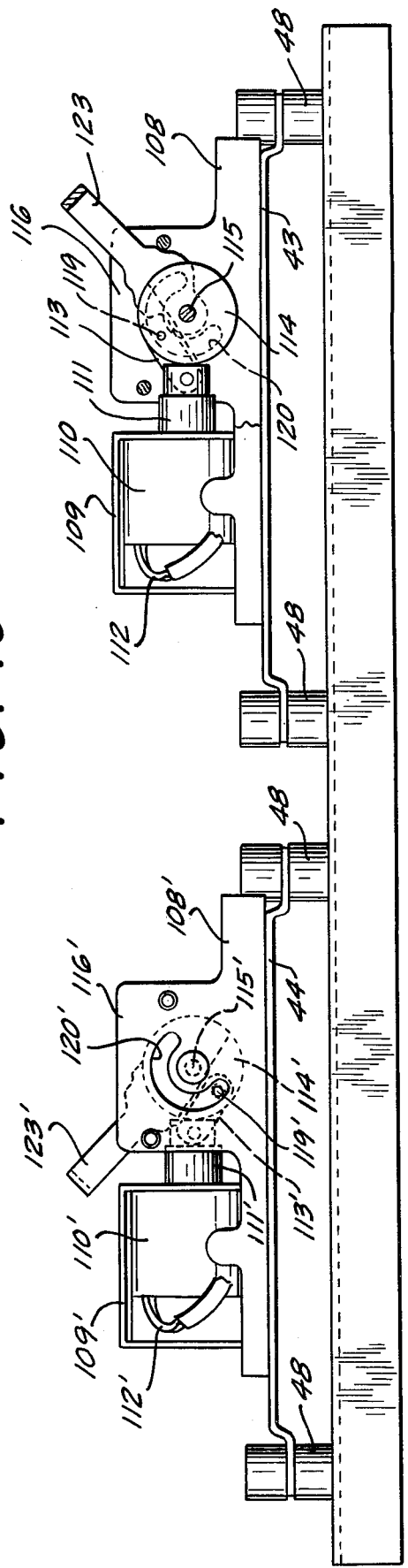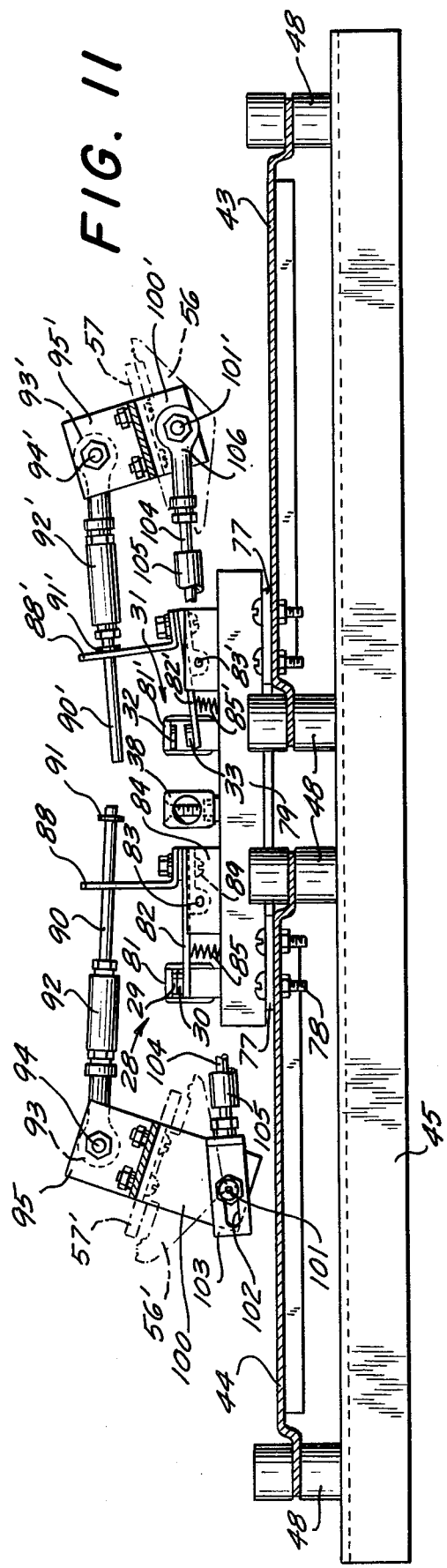

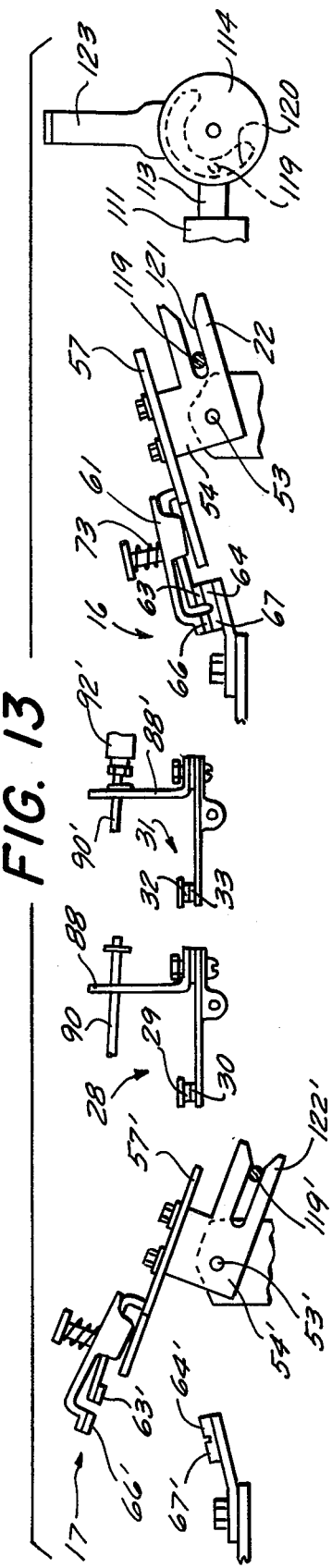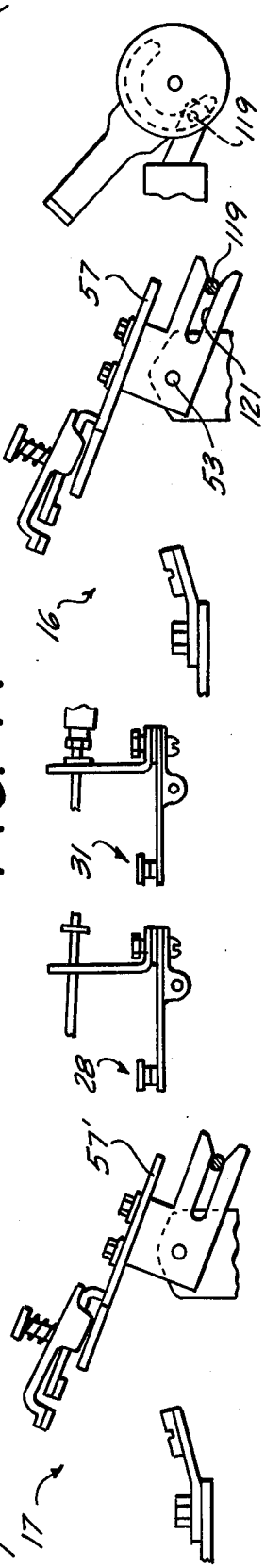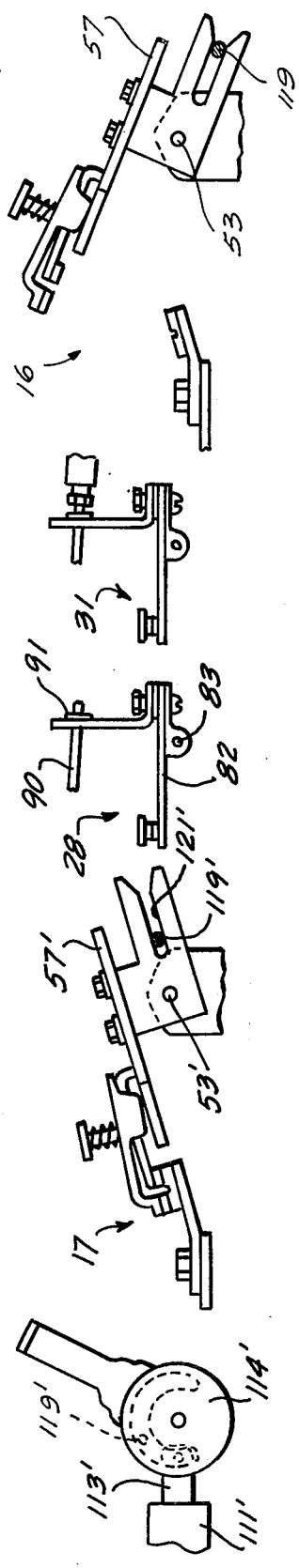

AUTOMATIC TRANSFER SWITCH

This invention relates to automatic transfer switches which are used to automatically transfer an electrical load from a normal source of electric power to an emergency source of electric power upon the happening of some predetermined event.

Automatic transfer switches are typically multi-pole switches. Thus, an automatic transfer switch used with a three phase, four wire system will always include three poles for switching the three phase conductors of the load between the three phase conductors of the normal power source and the three phase conductors of the emergency power source. The fourth, neutral conductor of the load is often permanently connected to the neutral conductors of the normal and emergency sources.

In certain instances, it has been found that the neutral conductors of the load, normal source, and emergency source, should not be permanently connected together. One such instance involves the situationn in which a ground fault detector is associated with the normal source. In such a case, it is possible that the interconnected and grounded normal source and emergency source neutral conductors can produce a situation in which a ground fault in the normal source will not be sensed by the ground fault detector. To overcome this problem, it is desirable to use a fourth pole of the transfer switch to transfer the load neutral from one power source to the other when the transfer switch operates.

Transferring the neutral has, however, caused its own problems. Although theoretically all four poles of the transfer switch operate simultaneously, as a practical matter it is impossible to insure that all four switches, namely, the three phase switches and the one neutral switch, connecting the load to a power source will open at precisely the same time. If it should happen that the neutral switch opens even an instant before the phase switches, severely unbalanced voltages may be applied to the load causing damage to it. Furthermore, in such a circumstance there may be danger to personnel.

This problem is outlined in copending application Ser. No. 545,052, filed Jan. 29, 1975, now U.S. Pat. No. 3,936,782, issued Feb. 3, 1976 wherein an automatic transfer switch is shown and described having provision for disconnecting the load neutral from the neutral of the power source from which the load is disconnected, and for transferring the load neutral to the alternative power source when the transfer switch is operated, but which nevertheless that the load neutral is never disconnected from a power source while the phase conductors of the load are still connected to that power source.

In the automatic transfer switch of the copending application a single actuating means, such as a solenoid, is employed to simultaneously operate the phase switches which control connection of the load to the normal power source and the phase switches which control connection of the load to the emergency power source. Also, the same actuating means serves to operate the switches which control connection of the load neutral conductor to the neutral conductors of the two power sources. More specifically, in the automatic transfer switch of the copending application, the three movable contacts of the load/emergency source phase switches are mounted on a single rocker mechanism so that all six movable contacts pivot about the single pivot axis of the rocker mechanism. Such a transfer switch has only two stable positions, one in which the load/normal source phase switches are closed and the load/emergency source phase switches are open, and the other in which the load/normal source phase switches are open and the load/emergency source phase switches are closed. In addition, when the actuating means operates, it swings the rocker mechanism to open the closed switches and instantaneously thereafter close the open switches.

While the automatic transfer switch of the copending application operates entirely satisfactorily, it is sometimes desirable to have an automatic transfer switch in which the load/normal source switches and the load/emergency source switches are operable independently. As a result, the duration for which the load phase conductors are disconnected from the phase conductors of both power sources during a transfer operation can be extended, e.g., up to several seconds. This can be important when a long arc is drawn between the movable and stationary contacts upon opening of the closed phase switches; a long period of duration of disconnection insures that the arc is extinguished before the open switches close. Furthermore, with independently operated switches, a stable condition can be achieved in which both seats of switches are open, should this be desired. In addition, standard contactor or switch components can be employed to make a transfer switch with independently operable load/normal souce and load/emergency source phase switches, as compared to the special switch components used to make the transfer switch of the copending application.

It is an object of the present invention to provide an automatic transfer switch having independently operable load/normal source and load/emergency source switches, and having provision for disconnecting the load neutral from the neutral of the power source from which the load is disconnected, and for transferring the load neutral to the alternative power source when the transfer switch is operated, but which nevertheless insures that the load neutral is never disconnected from a power source while the phase conductors of the load are still connected to that power source.

It is another object of the invention to provide such an automatic transfer switch in which at the time of a transfer operation the load neutral is connected to the neutrals of both the normal and emergency sources prior to disconnecting the load from the source to which it has been connected, and in which the load neutral remains connected to the neutrals of both the normal and emergency sources until after the load has been connected to the alternative source, after which the load neutral is disconnected from the neutral of the source to which the load had been connected.

It is an additional object of the invention to provide such an automatic transfer switch wherein the switches for controlling the connections of the load neutral conductor to the normal and emergency source neutral conductors are independently operable but wherein each such neutral switch is operated by the same actuating means which operates one of the sets of phase switches.

It is a further object of the invention to provide such an automatic transfer switch having interlock means to prevent closing of the load/normal source switches and the load/emergency source switches at the same time.

Additional objects and features of the invention will be apparent from the following description, in which reference is made to the accompanying drawings.

In the drawings

FIG. 8 is a cross-sectional view of the automatic transfer switch taken along line 8—8 of FIG. 7;

FIG. 9 is a fragmentary cross-sectional view taken along line 9—9 of FIG. 7;

FIG. 10 is an elevational view, partially in section, taken along line 9—9 of FIG. 7;

FIG. 11 is a cross-sectional view taken along line 10—10 of FIG. 7; and

FIGS. 12–16 are fragmentary cross-sectional views illustrating four stages during a transfer operation.

The invention will be described in connection with a three phase, four wire system in connection with which a four-pole automatic transfer switch is employed. However, it is understood that the invention has utility with other types of systems as well. Three poles of the transfer switch are used to control power to the three phase conductors of the load, and the fourth pole of the transfer switch controls connection of the load neutral conductor.

Figure 1:
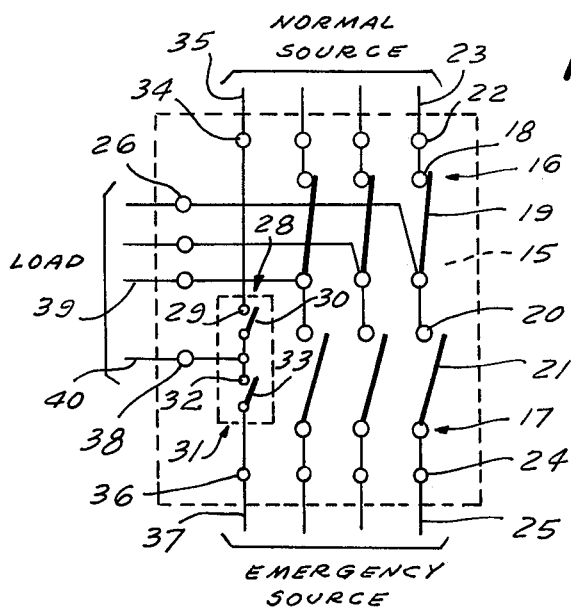
FIG. 1 is a schematic diagram of an automatic transfer switch according to the present invention.

In the schematic illustration of FIG. 1, the automatic transfer switch 15 chosen to illustrate the present invention includes a set of three phase switches 16 for connecting a normal source of electric power, such as that provided by an electric utility, to a load, a set of three phase switches 17 for alternatively connecting an emergency source of electric power, such as may be provided by a local engine-generator arrangement, to the load. Each of the switches 16 includes a stationary contact 18 and a movable contact 19, and each of the switches 17 includes a stationary contact 20 and a movable contact 21. Each stationary contact 18 is electrically connected to a terminal 22 of the transfer switch which can be connected to a phase conductor 23 of the normal source. Each of the movable contacts 21 is electrically connected to a phase conductor 25 of the emergency source. The movable contact 19 of each of switches 16 is electrically connected to the stationary contact 20 of one of the switches 17, and each interconnected pair of contacts 19 and 20 is electrically connected to a terminal 26 of the transfer switch. Terminal 26 can be connected to a phase conductor 39 of the load.

Automatic transfer switch 15 also includes a neutral switch 28, having a stationary contact 29 and a movable contact 30, and a neutral switch 31 having a stationary contact 32 and a movable contact 33. Stationary contact 29 is electrically connected to a terminal 34 of the transfer switch which can be connected to the neutral conductor 35 of the normal source. Movable contact 33 is electrically connected to a terminal 36 of the transfer switch which can be connected to the neutral conductor 37 of the emergency source. Movable contact 30 and stationary contact 32 are electrically interconnected and both are electrically connected to a terminal 38 of the transfer switch which can be connected to the neutral conductor 40 of the load.

Figure 2:
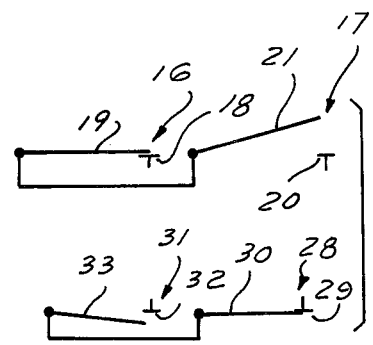
FIGS. 2–6 are schematic diagrams illustrating the operation of the phase switches and neutral switches of the automatic transfer switch.

FIGS. 2–6 illustrate schematically how the movable contacts 19, 21, 30, and 33 move in relation to each other. Initially, as shown in FIGS. 1 and 2, the three phase switches 16 are closed, as is neutral switch 28, and the three phase switches 17 are open, as is neutral switch 31. In other words, each movable contact 19 engages its respective stationary contact 18, movable contact 30 engages stationary contact 29, each of the movable contacts 21 is separated from its respective stationary contact 20, and movable contact 33 is separated from stationary contact 32. Consequently, the load is connected to the normal source and disconnected from the emergency source. Assume now that for some reason the load is to be disconnected from a normal source and connected to the emergency source. This may be because the normal source has failed.

Figure 3:
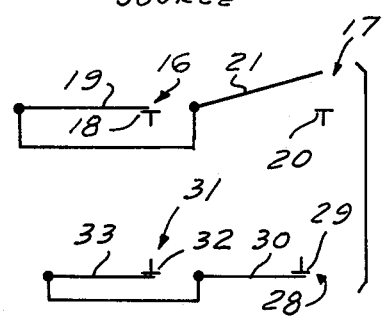
Figure 4:
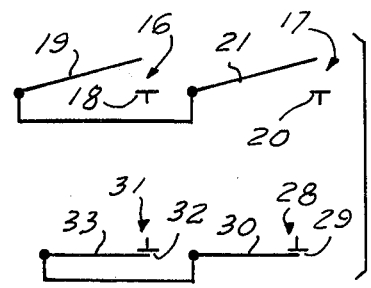
Figure 5:
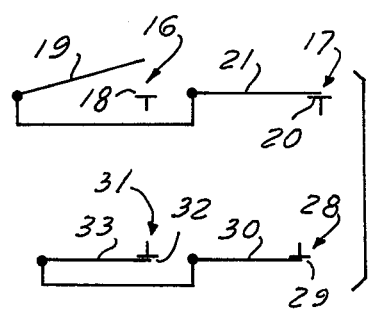
Figure 6:
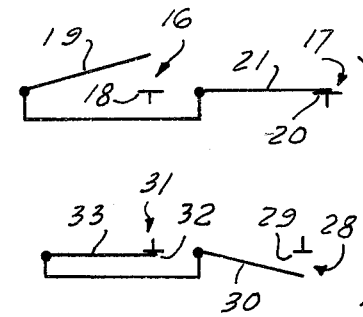

The first step in the transfer operation, as illustrated in FIG. 3, is that neutral switch 31 closes before phase switch 16 opens and while neutral switch 28 remains closed. Next, as shown in FIG. 4, phase switches 16 open while both neutral switches 28 and 31 remain closed. As a result, the load is now disconnected from the normal source, although it has not yet been connected to the emergency source. Following this, as shown in FIG. 5, phase switches 17 close while neutral switches 28 and 31 remain closed. As a result, the load is now connected to the emergency source. Finally, as indicated in FIG. 6, neutral switch 28 opens and neutral switch 31 remains closed. As a result, the load neutral is now disconnected from the normal source neutral, while the load phase and neutral conductors are connected to the emergency source phase and neutral conductors. In retransferring the load from the emergency source to the normal source, the same sequence of steps is followed, except in the reverse order.

It will be appreciated from the above description that the closing of neutral switches 28 and 31 overlaps the opening and closing of the phase switches 16 and 17. Thus, both neutral switches 28 and 31 are closed, to connect the load neutral to both the normal and emergency source neutrals, from before the time the load phase conductors are disconnected from the normal source phase conductors until after the time the load phase conductors are connected to the emergency source phase conductors.

A transfer switch according to the present invention is shown in more detail in FIGS. 7–10. The transfer switch includes two metal plate bases 43 and 44 mounted on two parallel metal bars 45 and 46, each bar having an inverted U-shaped cross section, by means of bolts 47. Insulators 48 surround the bolts and separate bases 43 and 44 from bars 45 and 46.

Base 43 carries a set of three phase switches 16, only one of the phase switches being shown in the drawings for the sake of convenience, and base 44 carries a set of three phase switches 17, only one such switch being shown. Base 43 also carries an actuator means 49, and base 44 carries a similar actuating means 49'. The phase switches and actuator means carried by the bases 43 and 44 are identical in construction and operation, and therefore only the switches and actuator means carried by base 43 will be described in detail, the corresponding parts carried by base 44 bearing the same reference numerals followed by a prime.

Mounted on base 43 are two spaced-apart upstanding brackets 51 and 52 (FIGS. 8 and 9). Pivotally mounted on bracket 51 by means of a pin 53 is an arm 54, and pivotally mounted on bracket 52 by means of a pin 55 is an arm 56. Extending between arms 54 and 56, and fastened to the arms, in a non-conductive plate 57.

Figure 7:
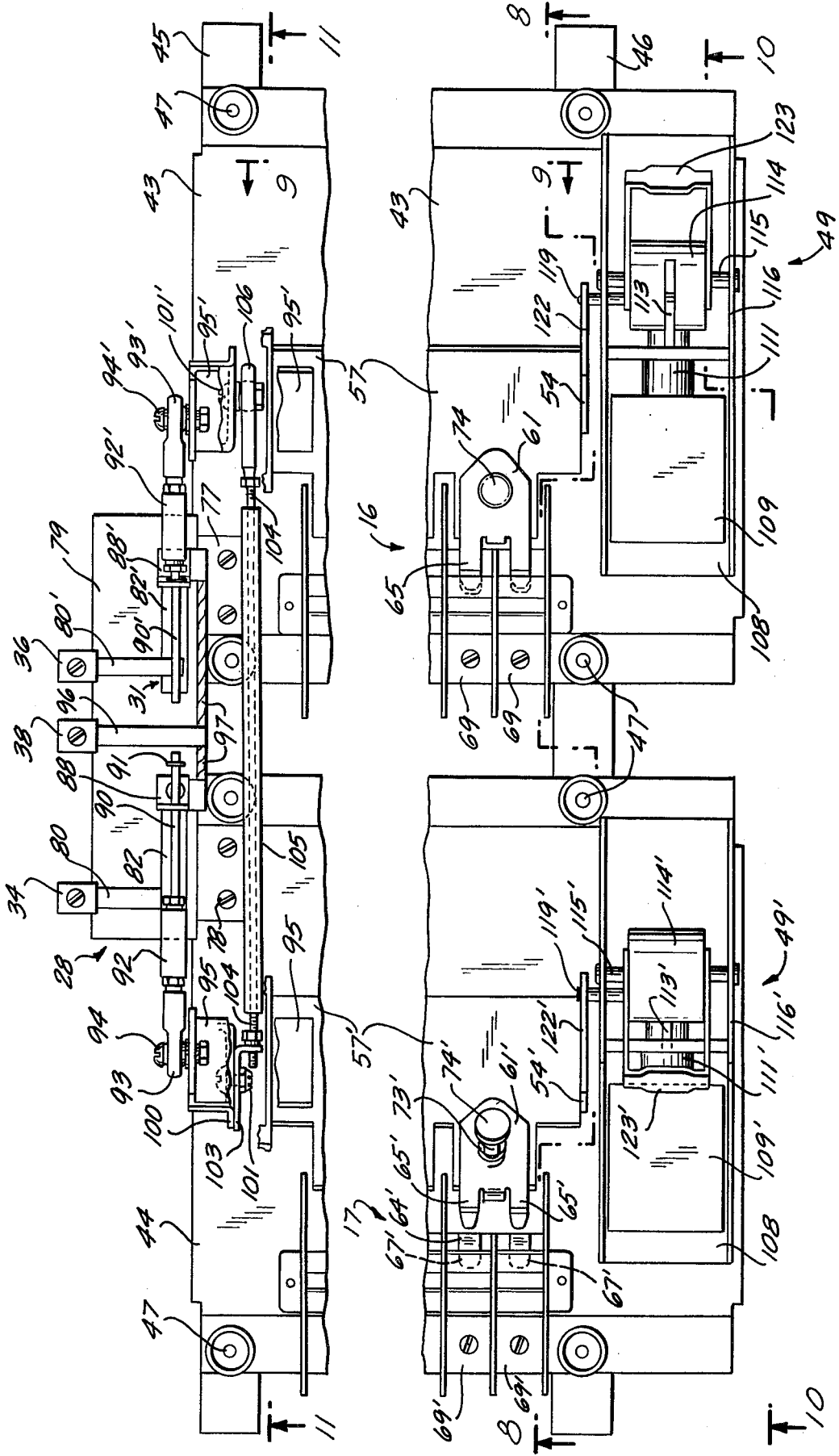
FIG. 7 is a fragmentary plan view of an illustrative automatic transfer switch according to the present invention.

Plate 57 carries three main contact elements 60, only one being shown in FIGS. 7 and 8, and three arcing contact elements 61, only one being shown in FIGS. 7 and 8, one arcing element 61 being arranged over each main contact element 60. Although separate arcing contacts are shown in this example, they may not be required in some transfer switch designs. Each main contact element 60 presents two fingers 62, each finger carrying a movable contact element 63 which cooperate with two stationary main contacts 64, respectively. Each arcing contact element 61 presents two fingers 65 each of which carries a movable arcing contact 66 which cooperate with two stationary arcing contacts 67. Each pair of stationary contacts 64 and 67 is mounted on an electrically conductive bracket 68 which is electrically connected to a terminal 69 by a conductive strip 70. Both the bracket 68 and strip 70 are mounted on an insulator bar 71 which in turn is fastened to base 43. In this way, each pair of stationary contacts 64 and 67 is insulated from every other such pair, and each terminal 69 is insulated from each other terminal. In addition, a vertical insulator plate 72 is arranged between each contact and terminal assembly 64, 67, 69 to prevent an arc from jumping from one set of contacts to another.

Movable contacts 63 and 66 are yieldingly urged toward their respective stationary contacts 64 and 67 by a compression spring 73 surrounding a post 74 projecting upwardly from plate 57 through holes in contact elements 60 and 61.

In practice, a normal source phase conductor is connected to one of the terminals 69, and one of the load phase conductors is connected to the other terminal 69 shown in FIG. 7. Consequently, when the corresponding phase switch is closed, i.e., contacts 63 engage contacts 64 of that switch, a circuit is completed from one of the terminals 69 through one of the stationary contacts 64, one of the movable contacts 63, the contact element 60, the other movable contact 63, and the other stationary contacts 64 to the other terminal 69. In this way, each of the three normal source phase conductors is connected to the corresponding three load phase conductors. Similarly, one of the emergency source phase conductors is connected to one of the terminals 69', and a corresponding one of the load phase conductors is connected to the other terminal 69'. As a result, when the phase switches 17 are closed, each load phase conductor is connected to a corresponding emergency sorce phase conductor.

In FIGS. 7 and 8, phase switches 16 are shown closed and phase switches 17 are shown open. It will be appreciated that by swinging arms 54 and 56, and hence plate 57, in a clockwise direction in FIG. 8, about the axis defined by pins 53 and 55, switches 16 will be opened. Conversely, by swinging arms 54' and 56', and hence plate 57', in a counter clockwise direction in FIG. 8, about the axis defined by pins 53' and 55', switches 17 will be closed. The manner in which arms 54 and 56 (and arms 54' and 56') are pivoted will be described below.

Referring to FIGS. 7 and 11, it will be seen that a bracket 77, secured to bases 43 and 44 by screws 78, projects in cantilever fashion past the edges of bases 43 and 44. An insulator block 79 is mounted on the upper face of bracket 77. Mounted on the upper face of block 79 are the two neutral switches 28 and 31. Since these two switches are identical in construction and function, only the switch 28 will be described in detail, and corresponding parts of switch 31 bear the same reference numerals followed by a prime.

Normal source neutral terminal 34 is carried by one end of a rigid conductive strip 80 mounted on the upper face of block 79. Near its other end, strip 80 is formed with two right angle bends so that its other end 81 is spaced above the upper face of block 79. Stationary contact 29 is carried by the lower face of end 81. Movable contact 30 is mounted at one end of an arm 82 in a position to engage contact 29. Arm 82 is pivotally mounted on a pin 83 supported between the walls of a U-shaped bracket 84 mounted on the upper face of block 79. A compression spring 85, arranged between block 79 and arm 82, constantly urges movable contact 30 into engagement with stationary contact 29. Mounted on the upper surface of arm 82, by a bolt 89, is an L-shaped bracket 88. Near its upper end, bracket 88 is formed with a hole slideably accommodating a rod 90. A disc 91 is fixed to rod 90 near one of its ends, and the other end of rod 90 is threaded into one end of a cylindrical insulator 92. Threaded into the other end of insulator 92 is an element formed with an eyelet 93 at its free end, the eyelet being pivotally secured by a bolt 94 to an angle bracket 95 fixed to the upper surface of plate 57'. A disc 91' is fixed to rod 90' at a point between bracket 88' and insulator 92'.

When plate 57' is in the position shown in FIG. 11, which corresponds to the phase switches 17 being open, it will be seen that neutral switch 28 is maintained closed by spring 85. On the other hand, when plate 57 is in the position shown in FIG. 11, which corresponds to phase switches 16 being closed, neutral switch 31 is open. This is because disc 91' is pressed against bracket 88' thereby pivoting arm 82' about pin 83' to separate contacts 32 and 33 against the force of spring 85'.

It will be seen in FIG. 7 that load neutral terminal 38 is mounted on a conductor 96 which is electrically connected to arms 82 and 82' by a braided electrical conductor 97. Thus, when neutral switch 28 is closed, load neutral terminal 38 is electrically connected to normal source neutral terminal 34. On the other hand, when neutral switch 31 is closed, load neutral terminal 38 is electrically connected to emergency source neutral terminal 36.

Secured to the lower face of angle bracket 95 is another angle bracket 100. The vertical leg of bracket 100 carries a bolt 101 which passes through an elongated slot 102 in an L-shaped member 103. One arm of member 103 is fixed to one end of a rigid rod 104 surrounded by an insulator sleeve 105. The opposite end of rod 104 is connected to an eyelet member 106 pivotally secured to angle bracket 100' by bolt 101'. Rod 104 serves as part of a means for preventing either of the sets of phase switches 16 or 17 from closing when the other set of phase switches is closed. This will be described in more detail below.

Actuator means 49 and 49' are identical in construction and function, and therefore only actuator means 49 will be described in detail, corresponding parts of actuator means 49' bearing the same reference numerals followed by a prime. As shown best in FIGS. 7 and 10, mounted on base 43 is a channel-shaped bracket 108 within which is secured an open-sided housing 109 containing an electrical solenoid 110. Solenoid 110 contains an axially-movable armature 111, and suitable conductors 112 for applying an electrical signal to the solenoid to energize it. Armature 111 is pivotally connected by a link 113 to a cylindrical weight 114 rotatably carried by a pin 115 extending between two upstanding walls 116 of bracket 108.

A second pin 119 projects from weight 114 parallel to pin 115, but eccentric with respect to the axis of rotation defined by pin 115. Pin 119 extends through an arcuate slot 120 (FIG. 10) in one of the walls 116 of bracket 108. The free end of pin 119 extends into a straight slot 121 (FIG. 12) formed in an arm 122 extending from arm 54 which carries plate 57. Pin 119 is slidable within slot 121. A U-shaped handle 123 straddles weight 114 and its two arms are fixed to the weight. By means of handle 123 and 123', switches 16 and 17, respectively, can be operated manually as well as means of solenoids 110 and 110'.

Figure 12:
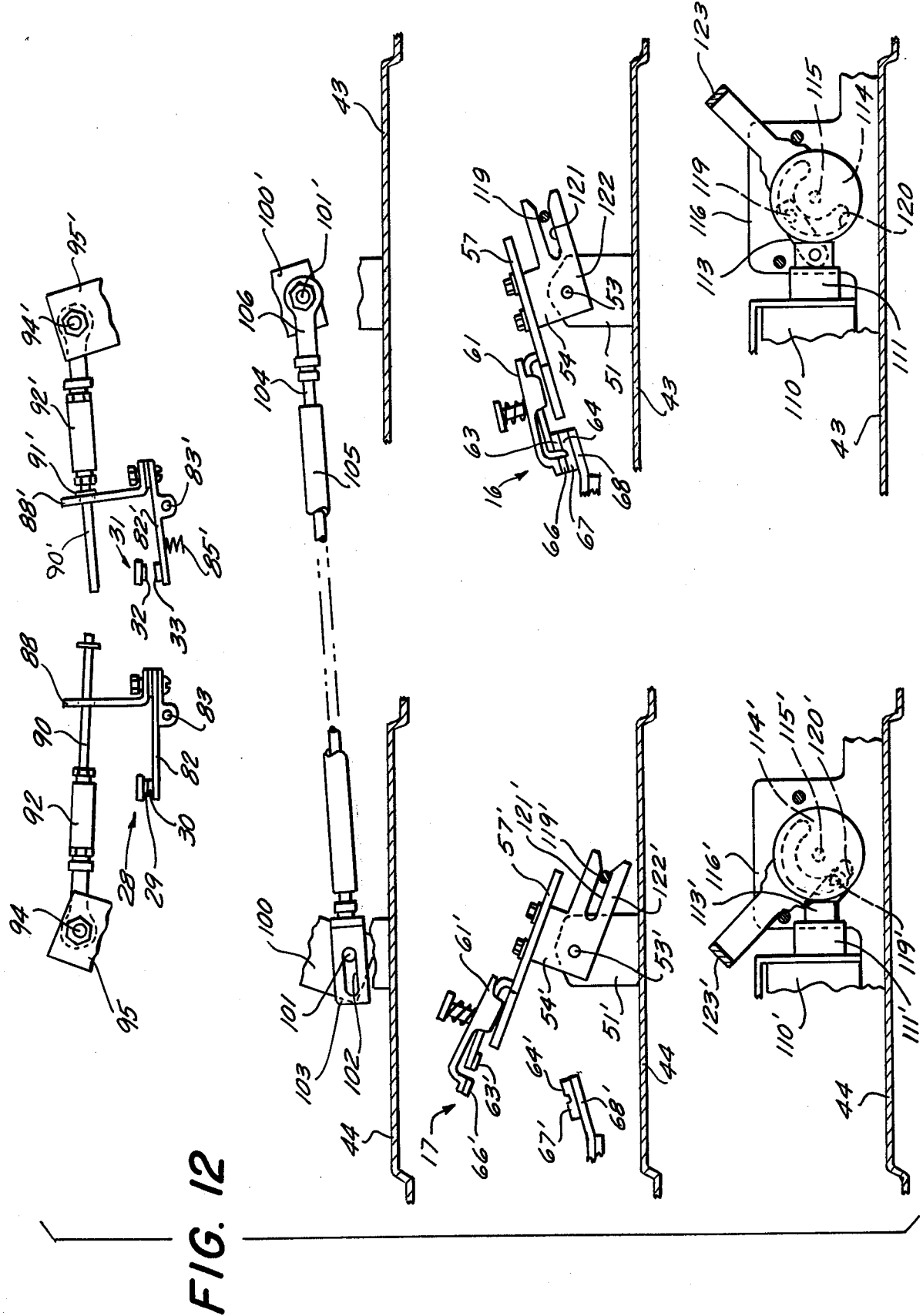

Weight 114 is pivotable between two extreme positions, one of which is illustrated in FIGS. 7, 10, and 12. When solenoid 110 is energized for an instant, armature 111 moves into the solenoid, i.e., toward the left in FIG. 10, causing weight 114 to rotate counter-clockwise in FIG. 10. Upon deenergization of solenoid 110, the inertia of weight 114 causes its continued rotation to its other extreme position illustrated in FIGS. 14 and 16. The difference between these two extreme positions can be seen by comparing the position of pin 119 in FIGS. 10 and 12, on the one hand, and in FIGS. 14 and 16 on the other hand. Should solenoid 110 be energized again, weight 114 is returned to its original position shown in FIGS. 10 and 12.

FIGS. 7-12 illustrate the position of the parts of the transfer switch when the load is connected to the normal source and disconnected from the emergency source. Thus, phase switches 16 and neutral switch 28 are closed, and phase switches 17 and neutral switch 31 are open. The reason that neutral switch 31 is open is that (See FIGS. 11 and 12) disc 91' fixed to rod 90' has engaged bracket 88' and pivoted it in a counter clockwise direction, in FIGS. 11 and 12, about pin 83' against the force of spring 85', so as to separate movable contact 33 from stationary contact 32.

Figure 16:
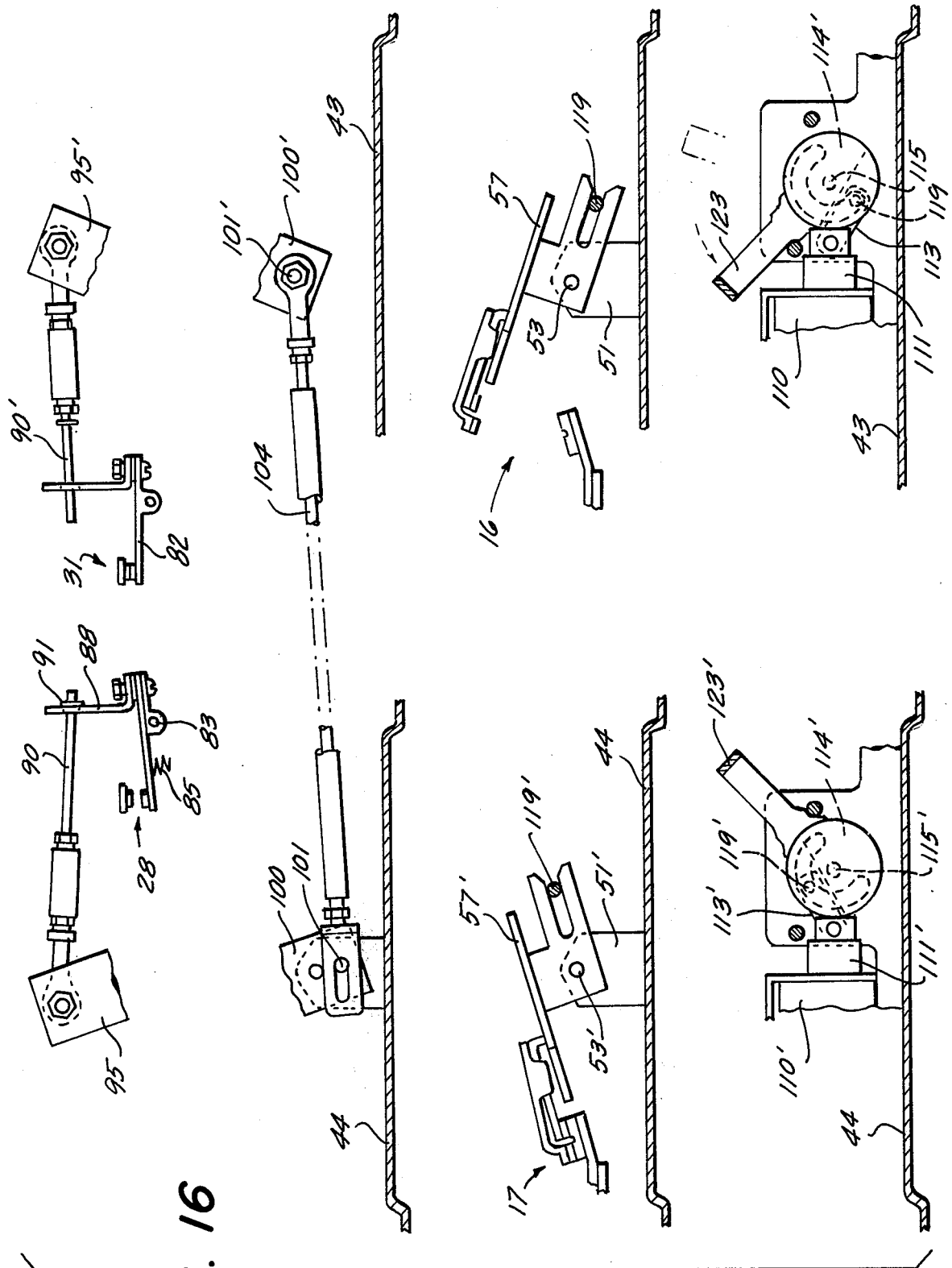

The operation of the transfer switch during transfer of the load from the normal source to the emergency source may best be seen in FIGS. 12-16. Each of these figures shows certain parts of the transfer switch at a particular instant of time. The views show the weight 114, 114' and their respective pins 119, 119'. In addition, all the views shown the phase switches 16 and 17 and the neutral switches 28 and 31, as well as some of the operating linkages for these switches. Furthermore, FIGS. 12 and 16 show the rod 104 and the connections at its ends.

Upon energization of solenoid 110, armature 111 begins to move into the solenoid, i.e., toward the left in FIG. 12, and during this initial movement weight 114 is rotated through a short distance in a counter-clockwise direction (compare FIGS. 12 and 13). This initial rotation of weight 114 causes plate 57 to rotate very slightly in a clockwise direction about pin 53, as a result of the cooperation of pin 119 with slot 121 in arm 54. This slight rotation of plate 57 does not effect opening of phase switches 16, since spring 73 maintains the phase switches closed. However, this initial rotation of plate 57 does cause similar slight rotation of angle bracket 95', which is carried by plate 57, thereby moving rod 90' toward the right in FIG. 12. As a result of this movement, spring 85' is permitted to raise arm 82' and thereby close neutral switch 31 (see FIG. 13). Thus, both neutral switches 28 and 31 are closed, although phase switches 16 have not yet opened.

Upon deenergization of solenoid 110, the inertia of weight 114 carries the weight to the position shown in FIG. 14. Pin 119 moving in slot 121 of arm 54 causes plate 57 to pivot in a clockwise direction about pin 53, whereby phase switches 16 open. At the same time, neutral switches 28 and 31 remain closed. It will be seen that both sets of phase switches 16 and 17 are now open.

Upon energization and deenergization of solenoid 110', armature 111' moves into and then out of the solenoid to thereby swing weight 114' from the position shown in FIG. 12 to that shown in FIG. 15. In the position of FIG. 15, weight 114' has almost reached its final position. As a result of the cooperation between pin 119' and slot 121', plate 57' has pivoted in a counter-clockwise direction about pin 53' so as to close phase switches 17. At this point, neutral switches 28 and 31 are also closed, as shown in FIG. 15. During the final increment of movement of weight 114' i.e., from the position shown in FIG. 15 to the position shown in FIG. 16, plate 57' is also moved through the last increment of its movement about pin 53', causing angle bracket 95 to pull rod 90 toward the left. The last portion of this leftward movement causes disc 91 to pivot bracket 88 and hence arm 82 in a counter-clockwise direction about pin 83, as a result of which neutral switch 28 is opened against the force of spring 85. Thus, only after phase switches 17 close does neutral switch 28 open.

When the load is to be disconnected from the emergency source and reconnected to the normal source, solenoid 110' is operated to open the phase switches 17, after which solenoid 110 is operated to close the phase switches 16. During this operation, neutral switch 28 closes first, after which phase switches 17 open, following which phase switches 16 close, after which neutral switch 31 opens.

Referring to FIG. 12, rod 104 is shown pivoted at its left end to angle bracket 100, which moves with plate 57', and pivoted at its right end to angle bracket 100' which moves with plate 57. With phase switches 16 closed, if it were attempted to close phase switches 17, it would be necessary to move weight 114' in a clockwise direction, which would cause angle bracket 100 to attempt to move in a counter-clockwise direction. In other words, bolt 101 carried by angle bracket 100 would be urged toward the right in FIG. 12, thereby urging rod 104 toward the right. The force on angle bracket 100' would have a tendency to pivot plate 57 in a clockwise direction about pin 53. However, it will be seen from FIG. 12 that a line drawn from pin 53 to pin 119 is substantially perpendicular to a line drawn from pin 119 to pin 115, about which weight 114 pivots. Consequently, arm 54 and hence plate 57 cannot possibly be pivoted about pin 53 unless weight 114 is moved. Thus, the rightward forced by rod 104 on angle bracket 100' has no effect. Consequently, while phase switches 16 are closed, it is impossible to close phase switches 17. Reference to FIG. 16 will indicate that the same state of affairs exists when phase switches 17 are closed and phase switches 16 are open. In other words, in that situation, it is impossible to close phase switches 16 while phase switches 17 are still closed.

It should be mentioned that there may also be an electrical interlock to prevent the solenoids 110 and 110' from being energized in such a manner as would cause both sets of phase switches to close at the same time. However, since each weight 114, 114' is provided with a manually-operable handle 123, 123', it is advantageous to also provide a mechanical interlock including the rod 104. It may also be mentioned that rod 90 is adjustable into and out of insulator 92 so as to adjust the position of disc 91, and thereby adjust the point in the cycle when neutral switch 28 opens. Similarly, rod 90' is adjustable into and out of insulator 92' to adjust the time during each cycle when neutral switch 31 opens and closes.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An automatic transfer switch for transferring an electrical load from a normal source of electric power to an emergency source of electric power, and vice versa, comprising:
   a. a first set of phase switches for connection between the normal source and a load,
   b. a second set of phase switches for connection between the emergency source and the load,
   c. a first neutral switch for connection between a normal source neutral conductor and the load neutral conductor,
   d. a second neutral switch for connection between an emergency source neutral conductor and the load neutral conductor,
   e. actuator means for opening and closing said first set of phase switches,
   f. actuator means operable independently of said actuator means (e) for opening and closing said second set of phase switches,
   g. means responsive to operation of said actuator means (e) for closing said second neutral switch before said first set of phase switches opens, and for opening said second neutral switch after said first set of phase switches closes, and
   h. means responsive to operation of said actuator means (f) for closing said first neutral switch before said second set of phase switches opens, and for opening said first neutral switch after said second set of phase switches closes.

2. An automatic transfer switch as defined in claim 1 including means for preventing either of said sets of phase switches from closing when the other set of phase switches is closed.

3. An automatic transfer switch as defined in claim 2 wherein each of said sets of phase switches includes a set of stationary contacts and a set of movable contacts cooperable therewith, and said preventing means includes means mechanically interconnecting said sets of movable contacts.

4. An automatic transfer switch as defined in claim 3 wherein said means mechanically interconnecting said sets of movable contacts includes a rigid rod pivotally connected to both sets of movable contacts.

5. An automatic transfer switch as defined in claim 3 wherein said preventing means also includes means associated with each of said actuator means for preventing the opening of its respective set of phase switches, when that set of phase switches is closed, except upon operation of the respective actuator means.

6. An automatic transfer switch as defined in claim 5 wherein said actuator means and said associated means include a member rotatable on a fixed axis, a fixed arcuate slot having a center of curvature on said axis, a pin projecting from said rotatable member and slidably accommodated by said arcuate slot, and a pivotally mounted link for transmitting movements of said pin to said movable contacts which are operated by said actuator means, the longitudinal axis of said link being substantially perpendicular to a line drawn between said pin and fixed axis when its respective phase switches are closed such that said link cannot pivot except upon movement of said pin by said actuator means.

7. An automatic transfer switch as defined in claim 1 wherein each of said sets of phase switches includes a set of stationary contacts and a set of movable contacts, each of said neutral switches includes a stationary contact and a movable contact, said responsive means (g) includes a link interconnecting the movable contacts of said first set of phase switches with the moveable contact of said second neutral switch, and said responsive means (h) includes a link interconnecting the movable contacts of said second set of phase switches with the movable contact of said first neutral switch.

8. An automatic transfer switch as defined in claim 7 wherein each of said links is pivotally connected to either said movable contacts of its respective set of phase switches or said movable contact of its respective neutral switch, and including a sliding lost motion connection between each of said links and the other of said movable contacts or movable contact.

9. An automatic transfer switch as defined in claim 1 wherein each of said actuator means is electrically operated.

10. An automatic transfer switch as defined in claim 9 wherein each of said actuator means is a solenoid.

* * * * *